United States Patent Office 3,466,275
Patented Sept. 9, 1969

3,466,275
MODIFIED PENICILLINS AND THEIR PREPARATION VIA PENICILLIN SULFOXIDES
Robert B. Morin and Billy G. Jackson, Indianapolis, Ind., assignors to Eli Lilly and Company, Indianapolis, Ind., a corporation of Indiana
No Drawing. Original application July 31, 1962, Ser. No. 213,588, now Patent No. 3,275,626, dated Sept. 27, 1966. Divided and this application Sept. 30, 1965, Ser. No. 491,832
Int. Cl. C07d 99/22, 99/16
U.S. Cl. 260—239.1                2 Claims

ABSTRACT OF THE DISCLOSURE

Compounds having the following general formula are disclosed. These compounds are useful antibiotics.

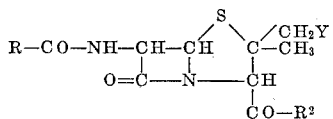

R may be an organic radical and $R^2$ may be H and pharmaceutically acceptable cations. Y may be acyloxy or alkoxy.

---

This application is a division of our application Ser. No. 213,588, filed July 31, 1962 now United States Patent 3,275,626, which issued Sept. 27, 1966.

The present invention relates to antibiotic substances. More particularly it relates to certain penicillin-derived antibiotics substances and to novel methods for their production.

The first of the antibiotics to be discovered were the penicillins, which contain the pnam nucleus, a thiazolidine ring with a fused β-lactam. A more recent discovery is the cephalosporins, which contain the $\Delta^3$-cephem nucleus, a dihydrothiazine ring with a fused β-lactam. These two classes of antibiotics are thus somewhat related in structure, as will be seen from the following general structural formulas:

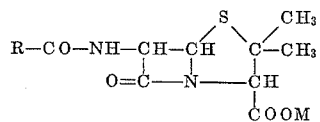

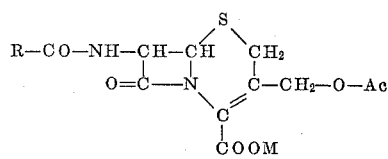

wherein R represents essentially any organic radical, as exemplified by hundreds of examples in the prior art, and M represents a pharmaceutically acceptable cation. The penam nomenclature for the penicillins is described by Sheehan, Henry-Logan, and Johnson in the J. Am. Chem. Soc., 75, 3293, footnote 2 (1953), and has been adapted to the cephalosporins by Morin, Jackson, Flynn, and Roeske in an article entitled "Chemistry of Cephalosporin Antibiotics. I. 7-Aminocephalosporanic Acid from Cephalosporin C," J. Am. Chem. Soc., 84, 3400, footnote 4 (1962). In accordance with these systems of nomenclature, "penam" and "cepham" refer respectively to the following saturated ring structures:

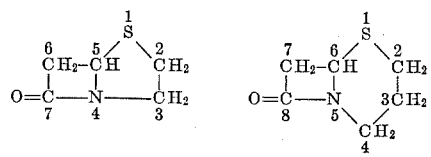

Penam                Cepham while "penem" and "cephem" refer to the same ring structure with a double bond, the position of which is indicated by a prefixed Δ with superscript denoting the carbon atom of lowest number to which the double bond is connected.

While the penicillins have been remarkably successful in the treatment of a variety of infections, and the cephalosporins have shown considerable promise in this direction, there is a continuing need for different and improved antibiotics. There has also been a need for a simple and economical method for synthesizing the cephalosporin compounds from available starting materials.

One object of the present invention is to prepare modified penicillins.

Other objects of the invention and its advantages over the prior art will be apparent from the following description, operating examples, and claims.

In one aspect, the present invention affords a novel class of compounds having the following structure:

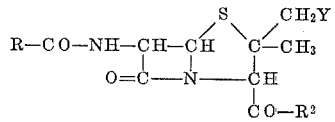

where:

R is an organic radical,
$R^2$, when linked directly to the molecule, is
   —$NH_2$,
   —NH—($C_1$–$C_4$ alkyl), or
   —N=di($C_1$–$C_4$ alkyl);
$R^2$, when linked to the molecule through —O—, is
   hydrogen,
   a pharmaceutically acceptable cation,
   $C_1$–$C_4$ alkyl,
   $C_4$–$C_7$ cycloalkyl,
   phenyl, or
   substituted phenyl; and
Y is
   $C_2$–$C_4$ acyloxy or
   $C_1$–$C_4$ alkoxy.

In the above formula, $R^2$, when linked directly to the molecule to form amides, may be exemplified by $CH_3NH$—

$C_2H_5NH$—, $C_4H_9NH$—, $(CH_3)_2N$—, $(C_2H_5)_2N$—, and $CH_3(C_2H_5)N$—. When linked to the molecule through an oxygen atom to form carboxylic acids, salts, and esters, $R^2$ may be exemplified by hydrogen; sodium, potassium, and ammonium; methyl, ethyl, n-propyl, isopropyl, n-butyl, sec.-butyl, isobutyl, and tert.-butyl; cyclobutyl, cyclopentyl, cyclohexyl, and cycloheptyl; phenyl; and chlorophenyl, bromophenyl, trichloromethylphenyl, nitrophenyl, methoxyphenyl, tolyl, and the like, the substituents being in the o-, m-, or p-position, and further substitution with these and other substituents being permitted.

Y may be exemplified by acetoxy, propionoxy, butyroxy, benzoxy, methoxy, ethoxy, propoxy, butoxy, and the like.

Illustrative of the products of the present invention is 2-acetoxymethyl - 2 - methyl-6-phenylacetamidopenam-3-carboxylic acid, but it is to be understood that the invention is not limited thereto.

The novel compositions can be obtained according to the following procedure.

In a preliminary step, penicillin nucleus (6-aminopenicillanic acid) or a pencillin having a 6-acylamido substituent group as desired is subjected to treatment with an oxidizing agent according to the method of the prior art, as described for example by Chow, Hall, and Hoover, J. Org. Chem., 27, 1381 (1962), to produce the corresponding sulfoxide:

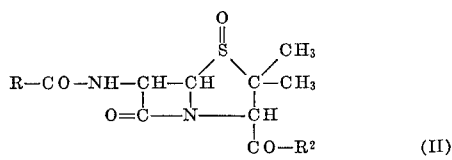

(II)

For this purpose, the penicillin compound is commingled with a substance affording active oxygen, such as metaperiodic acid, peracetic acid, or other organic per-acid or a salt thereof, hydrogen peroxide, iodosobenzene, or the like, in a proportion sufficient to supply around one atom of active oxygen per atom of thiazolidine sulfur. The penicillin can be used in the form of the free acid, but preferably as a salt, ester, or amide thereof, suitably dissolved in a solvent which is inert under the reaction conditions to be employed. Aqueous organic solvents of satisfactory type are available for all of the forms of penicillin. For many of the salts, water can satisfactorily be employed. The oxidizing agent is added at room temperature or somewhat below, preferably with cooling to avoid any substantial temperature rise, which might lead to over-oxidation. The reaction is conveniently followed by checking the reaction mixture with starch-iodide paper to detect the presence of active oxygen, and the reaction is terminated when all of the added active oxygen has been used up. The sulfoxide obtained thereby is readily recovered in a known manner suitably by evaporation of the solvent and recrystallization, or by precipitation at low pH from aqueous reaction mixtures. Recrystallization is conveniently effected from aqueous methanol (1:2).

The pencillin sulfoxide obtained thereby is readily converted to the compounds of the present invention by heating to elevated temperature in the presence of an acidic substance which affords radical Y in equimolar proportion to the penicillin sulfoxide, e.g., acetic anhydride, propionic anhydride, and other acid anhydrides, acyl chlorides, and the like. No additional solvent or liquid medium is necessary for the reaction, but a liquid medium is desirable in order to facilitate heat transfer and to moderate the reaction. A preferred solvent and acid reactant combined is acetic anhydride. Any organic liquid can be added for this purpose so long as it is substantially inert to the other reactants under the conditions employed. The reaction temperature should lie in the range of about 100 to about 175° C., preferably about 125 to about 150° C. The conversion is generally found to reach a substantial level after as little as 5 minutes, and is ordinarily complete in less than one hour. The reaction time should be kept as short as possible in order to minimize the formation of undesirable by-products.

After completion of the reaction, the reaction mixture is cooled, and the solvent, if any, is stripped off at reduced pressure. The residue obtained thereby is separated into its components by any convenient method, such as chromatography over silica gel or the like, employing a ketonic solvent for the elution. Other adsorbent solids may be employed as desired, such as silica-alumina, cellulose, Florisil, or the like. For the solvent, methyl isobutyl ketone, methyl ethyl ketone, or acetone can be employed, diluted to some extent with a nonpolar solvent such as hexane, cyclohexane, or benzene, and preferably containing at least some proportion of water, up to the saturation level. The crude substance is first dissolved in an organic solvent such as the eluting solvent to be used thereafter, which solution is applied to the chromatographic column. Elution is then carried out, the eluate fractions being checked by thin-layer chromatography to identify the products in the successive fractions. The appropriate fractions are combined and are further treated to isolate the individual products, suitably by crystallization.

The free acids and salts of the products of the invention can be obtained from the esters or amides by selective hydrolysis in a conventional manner, or from suitable esters by catalytic hydrogenolysis.

The foregoing procedure produces a mixture of modified penicillins and cephalosporins. When the reaction is carried out with an acid anhydride upon the penicillin sulfoxide in the form of an ester or amide, the products are obtained in a total yield of around 60 percent of somewhat higher. Generally speaking, when the penicillin sulfoxide is treated in the form of an ester or an amide, the ester or amide moiety tends to be retained in the product, while when the penicillin sulfoxide is treated in the form of the free acid or a salt, the products tend to be of the decarboxylated class.

The mechanism by way of which the process of the present invention accomplishes the desired results has not been established with certainty, but may involve the following steps.

In the first step, wherein the penicillin sulfoxide is subjected to heat treatment under acid conditions, the acidic material may be formulated generally as QZ, where Q is an electrophile and Z is a nucleophile. It is reasonable to postulate that the acidic reagent attacks the sulfoxide oxygen to produce a reactive intermediate,

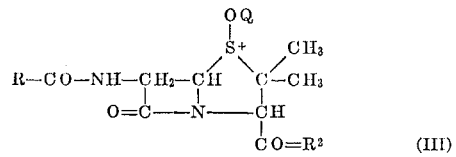

(III)

The intermediate then undergoes rupture of the bond between the sulfur and the $C^2$ atom, with concommitant loss of a proton on one of the $C^2$ methyl groups, presumably the one cis to the sulfoxide oxygen, yielding a sulfenic acid intermediate,

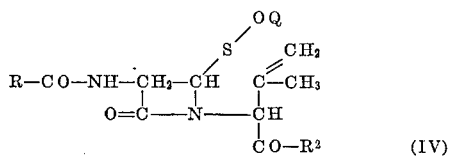

(IV)

In the latter, the sulfenic acid moiety can add internally to the double bond in two ways, both of which give rise to intermediates with electron-deficient centers. In one mode of addition, the sulfur atom adds to the methylene group, splitting off —OQ, and giving a thiazine compound

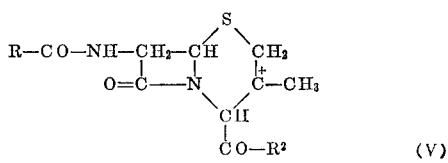

(V)

In the other mechanism, the sulfur atom adds to the original C² atom, splitting off —OQ and yielding a thiazolidine compound:

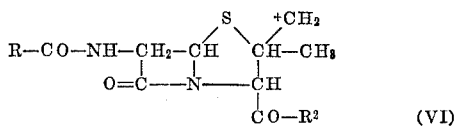

(VI)

In the case of intermediate VI, the electron deficiency can be satisfied by the addition of a nucleophile Y to give the products of the present invention. The nucleophile Y can be either an anion Z⁻ formed in the first stage of the reaction or —OQ liberated in the succeeding step, and may, for instance, be the conjugate base of the solvent (e.g., acetoxy from acetic anhydride). Thus, the substituent introduced thereby can be ether, ester, hydroxyl, halide, or acyloxy, depending upon the reagent or solvent used. The overall rearrangement of IV to the compounds of the present invention is stereospecific in that only one isomer is formed in the reaction. This suggests that the reaction takes place by way of a cyclic sulfonuim intermediate, with addition of the nucleophile Y in a position trans to the sulfur atom.

In the penicillin starting material, the side chain R can be any organic radical, so long as it is sufficiently stable under the reaction conditions to permit the desired conversion to go forward. The prior art discloses many hundreds of such side chains, as will be seen by reference to such publications as Behrens et al. U.S. Patents 2,479,-295, 2,479,296, and 2,479,297 (Aug. 16, 1949), Doyle U.S. Patent 2,951,839 (Sept. 6, 1960), Abildgaard Belgian Patent 593,295, and numerous others. The processing methods of the invention are concerned with modifications of the thiazolidine ring structure of the starting material; and so far as can be ascertained, the nature of the substituent in the 6-position of the molecule has essentially no bearing upon the desired result. The side chain R can accordingly be alkyl, alkoxyalkyl, alkylmercaptoalkyl, cycloalkyl, cycloalkoxyalkyl, cycloalkylmercaptoalkyl, aryl, aryloxyalkyl, arylmercaptoalkl, aralkyl, heterocyclic, heterocyclicalkyl, and the like, with or without substituents such as halo, alkyl, nitro, acyl, trifluoromethyl, alkoxy, alkylmercapto, phenylmercapto, and the like. The choice of starting material will generally be dictated by the structure of the desired product; but in general it can be said that the greater the stability of the starting material to acid, the higher the yield of product obtained in accordance with the invention.

Illustrative penicillins include, but are not limited to, the following:

Benzyl
Phenoxymethyl
n-Heptyl
2,6-dimethoxyphenyl
α-Phenoxyethyl
1-phenoxyisopropyl
α-Aminobenzyl The penicillins can be employed in the form of the free acids; the sodium, potassium, amine, or other salts; the methyl, ethyl, n-butyl, or other esters; or the amide, the N-methylamide, the N,N-diethylamide, or other amides, the choice depending to some extent upon the desired end product, since the course of the reaction is influenced by the structure of the penicillin at the carboxyl group, as pointed out above. The penicillin may be converted to the desired form before or after conversion to the sulfoxide, as desired.

In the new compounds provided by the present invention, the β-lactam has greater chemical and penicillinase stability than the compounds of the prior art. The acids and salts exhibit the ability in greater or lesser degree to destroy or inhibit the growth of many microorganisms, among which are the Staphylococci, the Streptococci, and the Bacilli. Numerous uses for the compounds will thus be apparent from the art; e.g., as topical sterilants. The esters and amides are useful as intermediates in the production of the acids and salts. Especially useful are the 2-acyloxymethyl penicillins represented by Formula I, which can be converted directly into cephlosporins by repetition of the process of the invention.

The structures of the compounds of the present invention have been proved by way of their infrared, ultraviolet, and nuclear magnetic resonance spectra. The materials show a hydroxylamine test typical of penicillins, and the mobility of the acids on paper electrophoresis is similar to the corresponding penicillins. They are conveniently analyzed by the method of Ford, Analytical Chemistry, 19, 1004 (1947), which is based upon the quantitative determination of the β-lactam moiety of the molecule via reaction with hydroxylamine. Their antibiotic potencies are readily determined against a standard organism such as Staphylococcus aureus 209P by appropriate modifications of the paper disc plate methods of Higgins et al., Antibiotics & Chemotherapy, 3, 50–54 (1953) and Loo et al., Journal of Bacteriology, 50, 701–709 (1945).

The invention will be more fully understood from the following operating examples:

EXAMPLE 1

A solution of 500 mg. of penicillin V sulfoxide methyl ester in 35 ml. of acetic anhydride was heated at reflux for one-half hour and then evaporated to dryness at reduced pressure. The oily residue obtained thereby was taken up in ethyl acetate and the solution was washed successively with cold dilute aqueous sodium bicarbonate solution, water, and saturated aqueous sodium chloride solution. The washed solution was dried over sodium sulfate and evaporated to dryness at reduced pressure. The amorphous product (530 mg.) obtained thereby was chromatographed through a silicic acid column, using a mixture of cyclohexane and methyl isopropyl ketone (4:1) saturated with water as the eluting solvent. The eluate was collected in 7-ml. fractions at 20-minute intervals, which were analyzed by thin-layer chromatography and suitably combined for product isolation.

Fractions 75–88, 195 mg., constituted the penam derivative, 2 - methyl - 2 - acetoxymethyl - 3 - carbomethoxy - 6-phenoxyacetamidopenam. This material was rechromatographed for analysis. The purified product was an amorphous solid weighing 170 mg.

*Analysis.*—Calc. for $C_{19}H_{22}O_7SN_2$: C, 54.01; H, 5.25; N, 6.63; S, 7.59; acetyl, 10.18; methoxyl, 7.35. Found: C, 53.55; H, 5.47; N, 6.26; S, 7.18; acetyl, 10.41; methoxyl 6.93.

The antibiotic activity of the product was determined according to the following procedure. A sample of the product was incubated at pH 7 in phosphate buffer for 20 hours at 37° C. with shaking. At the end of the incubation period, the solution was subjected to assay against various microorganisms by the conventional paper disc plate method. The incubated solution was also tested by paper electrophoresis followed by bioautographic assay. It was found to be active against *Staphylococcus aureus* and *Bacillus subtilis*, but not against gram-negative organisms. Paper electrophoresis showed it to be an acid antibiotic having the same mobility as penicillin V. The zone size produced on electrophoresis was comparable to the product produced by penicillin V methyl ester when similarly treated.

EXAMPLE 2

Penicillin V sulfoxide benzhydryl ester was reacted with acetic anhydride according to the procedure of Example 1. The product was a mixture of the benzhydryl esters of 2 - methyl-2-acetoxy-methyl-6-phenoxyacetamidopenam-3-carboxylic acid and 3-methyl-3-acetoxy-7-phenoxyacetamidocepham-4-carboxylic acid.

We claim:
1. A compound of the structure

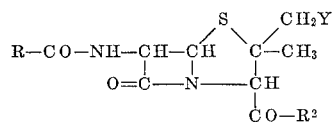

where R is selected from the group consisting of benzyl, phenoxymethyl, n-heptyl, 2,6-dimethoxyphenyl, α-phenoxyethyl, 1-phenoxyisopropyl, and α-aminobenzyl; Y is a member of the group consisting of $C_2$–$C_4$-acyloxy and $C_1$–$C_4$-alkoxy; and $R^2$ is connected through —O— to the molecule and is a member of the group consisting of hydrogen, the pharmaceutically acceptable cations, $C_1$–$C_4$ alkyl, $C_4$–$C_7$ cycloalkyl, and phenyl.

2. 2 - methyl - 2 - acetoxymethyl - 3 - carbomethoxy-6-phenoxyacetamidopenam.

References Cited

UNITED STATES PATENTS 3,177,203   4/1965   Goldberg et al. _____ 260—239.1

NICHOLAS S. RIZZO, Primary Examiner

U.S. Cl. X.R.

260—999